United States Patent
Kong et al.

(10) Patent No.: US 12,413,407 B2
(45) Date of Patent: Sep. 9, 2025

(54) CIPHERS TO PROTECT KEYSTROKES

(71) Applicant: Omnissa, LLC, Mountain View, CA (US)

(72) Inventors: Xiaoyu Kong, Beijing (CN); Zhiyuan Wang, Beijing (CN); Yiqun Yun, Beijing (CN); Zhanglin Zhou, Beijing (CN); Yang Yu, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 223 days.

(21) Appl. No.: 18/311,879

(22) Filed: May 3, 2023

(65) Prior Publication Data
US 2024/0333502 A1 Oct. 3, 2024

(30) Foreign Application Priority Data
Mar. 31, 2023 (WO) ................ PCT/CN2023/085332

(51) Int. Cl.
*H04L 9/14* (2006.01)
*G06F 21/83* (2013.01)
*H04L 9/08* (2006.01)

(52) U.S. Cl.
CPC ................ *H04L 9/14* (2013.01); *G06F 21/83* (2013.01); *H04L 9/0825* (2013.01)

(58) Field of Classification Search
CPC .......... H04L 9/14; H04L 9/0825; G06F 21/83
See application file for complete search history.

(56) References Cited

U.S. PATENT DOCUMENTS

| | | | |
|---|---|---|---|
| 11,550,922 B2 | 1/2023 | Soman et al. | |
| 12,032,726 B1* | 7/2024 | Tas | .......................... G06F 21/83 |
| 2007/0182714 A1 | 8/2007 | Pemmaraju | |
| 2009/0296928 A1 | 12/2009 | Matsumoto et al. | |
| 2010/0195825 A1 | 8/2010 | Cini | |
| 2012/0079282 A1 | 3/2012 | Lowenstein et al. | |
| 2016/0371472 A1 | 12/2016 | Walsh | |

(Continued)

FOREIGN PATENT DOCUMENTS

| | | |
|---|---|---|
| KR | 2002-0048313 A | 6/2002 |
| KR | 2004-0009575 A | 1/2004 |
| WO | 2018078212 A1 | 5/2018 |

OTHER PUBLICATIONS

Unknown, "WM_SETFOCUS message", https://docs.microsoft.com/en-us/windows/desktop/inputdev/wm-setfocus, May 30, 2018; retrieved on Feb. 9, 2023, 2 pages.

(Continued)

*Primary Examiner* — Hany S. Gadalla
(74) *Attorney, Agent, or Firm* — Kim & Stewart LLP

(57) ABSTRACT

Encrypting keystroke data on a computing device involves receiving a key identifier (ID) from a keyboard device, creating a keystroke cipher segment comprising a primary authentication code and the key ID, and encrypting the keystroke cipher segment to generate an encrypted keystroke cipher segment. The keystroke cipher segment is included within a keystroke message and transmitted from the keyboard device driver to a window event handler via an input/output (I/O) message channel native to an operating system running on the computing device. The encrypted keystroke cipher segment is decrypted to identify the key ID, which is transmitted to a first application for further processing.

20 Claims, 7 Drawing Sheets

(56) References Cited

U.S. PATENT DOCUMENTS

| | | | |
|---|---|---|---|
| 2017/0104597 A1 | 4/2017 | Negi et al. | |
| 2017/0286141 A1 | 10/2017 | Adler et al. | |
| 2018/0026947 A1 | 1/2018 | Haworth et al. | |
| 2019/0370013 A1 | 12/2019 | Katchapalayam | |
| 2020/0104538 A1* | 4/2020 | Summers | G06F 21/606 |
| 2021/0034743 A1* | 2/2021 | Tan | G06F 21/568 |
| 2021/0216644 A1 | 7/2021 | Soman et al. | |
| 2022/0092221 A1* | 3/2022 | Scillieri | H04L 63/0428 |
| 2022/0245287 A1* | 8/2022 | Fernandez | H04W 12/50 |

OTHER PUBLICATIONS

Unknown, "Virtual-Key Codes", https://docs.microsoft.com/en-us/windows/desktop/inputdev/virtual-key-codes, May 31, 2018; retrieved on Feb. 9, 2023, 19 pages.

Unknown, "Window Messages", https://docs.microsoft.com/en-us/windows/desktop/learnwin32/window-messages, May 31, 2018; retrieved on Mar. 2, 2020.

Unknown, "WM_KEYDOWN message", https://docs.microsoft.com/en-us/windows/desktop/inputdev/wm-keydown, May 30, 2018; retrieved on Feb. 9, 2023, 3 pages.

Unknown, "WM_KILLFOCUS message", https://docs.microsoft.com/en-us/windows/desktop/inputdev/wm-killfocus, May 31, 2018; retrieved on Feb. 9, 2023, 2 pages.

Ogelsby, R., "A look at the VMware Horizon key logger blocker—Ron's Cool Feature of the Week ", https://blogs.vmware.com/euc/2022/01/a-look-at-the-vmware-horizon-key-logger-blocker-rons-cool-feature-of-the-week.html, VMware, Jan. 27, 2022, 9 pages.

Hex-Rays, "IDA Pro", https://hex-rays.com/ida-pro/, Hex-Rays, Copyright 2023, retrieved on Feb. 8, 2023, 12 pages.

Hex-Rays, "IDA Freeware", https://hex-rays.com/ida-free/, Hex-Rays, Copyright 2023, retrieved on Feb. 8, 2023, 8 pages.

Hex-Rays, "Interactive Operation", https://hex-rays.com/ida-free/, Hex-Rays, Copyright 2023, retrieved on Feb. 8, 2023, 9 pages.

Unknown, "CryptMT. The Cryptographic Mersenne Twister", http://www.math.sci.hiroshima-u.ac.jp/m-mat/MT/CRYPTMT/index.html, Japan Society for the Promotion of Science, retrieved on Feb. 8, 2023, 2 pages.

Unknown, "CryptMT", https://en.wikipedia.org/wiki/CryptMT, Wikipedia, retrieved on Feb. 8, 2023, 1 page.

Unknown, "Advanced Encryption Standard", https://en.wikipedia.org/wiki/Advanced_Encryption_Standard, Wikipedia, retrieved on Feb. 8, 2023, 14 pages.

Unknown, "AES implementations", https://en.wikipedia.org/wiki/AES_implementations, Wikipedia, retrieved on Feb. 8, 2023, 6 pages.

Unknown, "Keyboard_Input_Data structure (ntddkbd.h)", https://learn.microsoft.com/en-US/windows/win32/api/htddkbd/ns-ntddkbd-keyboard_input_data, Microsoft, Aug. 3, 2021, Retrieved on Feb. 9, 2023.

Unknown, "Block cipher mode of operation", https://en.wikipedia.org/wiki/Block_cipher_mode_of_operation, Wikipedia, retrieved on Feb. 9, 2023, 20 pages.

Unknown, "Stream Cipher", https://en.wikipedia.org/wiki/Stream_cipher, Wikipedia, retrieved on Feb. 9, 2023, 7 pages.

Unknown, "Block cipher", https://en.wikipedia.org/wiki/Block_cipher, Wikipedia, retrieved on Feb. 9, 2023, 16 pages.

Unknown, "GDES", https://en.wikipedia.org/wiki/GDES, Wikipedia, retrieved on Feb. 9, 2023, 1 page.

Unknown, "Lucifer (cipher)", https://en.wikipedia.org/wiki/Lucifer_(cipher), Wikipedia, retrieved on Feb. 9, 2023, 2 pages.

Unknown, "Madryga", https://en.wikipedia.org/wiki/Madryga, Wikipedia, retrieved on Feb. 9, 2023, 2 pages.

Unknown, "Simon (cipher)", https://en.wikipedia.org/wiki/Simon_(cipher), Wikipedia, retrieved on Feb. 9, 2023, 6 pages.

Unknown, "Speck (cipher)", https://en.wikipedia.org/wiki/Speck_(cipher), Wikipedia, retrieved on Feb. 9, 2023, 7 pages.

Unknown, "Chosen-plaintext attack", https://en.wikipedia.org/wiki/Chosen-plaintext_attack, Wikipedia, retrieved on Feb. 9, 2023, 4 pages.

Unknown, "Chosen-ciphertext attack", https://en.wikipedia.org/wiki/Chosen-ciphertext_attack, Wikipedia, retrieved on Feb. 9, 2023, 3 pages.

Unknown, "Interactive Operation", Hex-Rays, copyright 2023, retrieved Mar. 26, 2023, https://www.hex-rays.com/products/decompiler/manual/interactive.shtml, 8 pages.

Unknown, "Hash Function Prospector", GitHub, Inc., copyright 2023, https://github.com/skeeto/hash-prospector, 10 pages.

* cited by examiner

CIPHERS TO PROTECT KEYSTROKES

CROSS REFERENCE TO RELATED

This application claims the benefit of priority of Chinese Patent Application No. PCT/CN2023/085332, filed Mar. 31, 2023, entitled "Ciphers to Protect Keystrokes", the entirety of which is incorporated herein by reference.

BACKGROUND

Key logging is a process involving the capture of keystrokes made by a user via an input device, such as a physical keyboard. Software-based keyloggers are computer programs designed to record keyboard input without interrupting the input/output (I/O) flow between the input device and the application(s) that receive the input stream. Such keyloggers have been developed for various reputable uses, such as troubleshooting of technical problems with computers and their use within enterprise environments or monitoring computer usage in family settings. However, many nefarious uses of such keyloggers are possible. For example, keyloggers have been maliciously installed unbeknownst to users to steal passwords, credit card numbers, personal information, or otherwise illegally spy on users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for encrypting keystroke data. Solutions include: receiving, by a keyboard device driver of the computing device, a key identifier (ID) from a keyboard device, the key ID representing a keystroke event occurring on the computing device via the keyboard device; creating a keystroke cipher segment comprising a primary authentication code and the key ID; encrypting the keystroke cipher segment to generate an encrypted keystroke cipher segment; creating a keystroke message comprising at least the encrypted keystroke cipher segment; transmitting the keystroke message from the keyboard device driver to a window event handler via an input/output (I/O) message channel native to an operating system running on the computing device, the window event handler being responsible for providing keystroke data to applications running on the operating system; receiving the keystroke message at the window event handler; decrypting the encrypted keystroke cipher segment, thereby identifying the key ID; and transmitting the key ID to a first application.

BRIEF DESCRIPTION OF THE DRAWINGS

The present description will be better understood from the following detailed description read in the light of the accompanying drawings, wherein.

Any of the figures may be combined into a single example or embodiment.

DETAILED DESCRIPTION

Solutions encrypt at least portions of I/O from a physical or virtual input device and through portions of an I/O message stream such that traditional software-based keyloggers cannot snoop plaintext keystroke data coming from the input device. An encryptor (e.g., encryption module, engine, component, or the like) is installed and used at the device driver level that allows the device driver to encrypt key identifiers (or "key IDs") in a very short cipher. This cipher segment is embedded within a keystroke message and sent, for example in a keystroke I/O message channel native to an underlying operating system of the computing device, from the device driver to a window event manager (e.g., a window procedure under Windows, a window event handling function under Linux or macOS, or the like) that is tasked with providing the keystroke data to whichever active window is currently receiving I/O from the input device. A decryptor (e.g., decryption module, engine, component, or the like) is installed and used by this window event handler 122 to decrypt the cipher segment, revealing the plaintext keystroke data, which is then passed onto the active window (e.g., for display, further processing, etc.).

Aspects of the disclosure improve the functioning of the computer by protecting plaintext keystroke data from being snooped by software-based keyloggers as keystroke messages transit the native keystroke I/O message channel. These techniques limit network traffic on the native I/O message channel by utilizing native I/O message channel protocols and fields for the cipher segment. This both allows the feature to work within existing message sizes, thus not increasing the network packet size of I/O messages, as well as limits the scope of changes to the operating system to enable such features. Thus, aspects of the disclosure provide a practical, useful result to solve a technical problem in the domain of computing.

Figure 1:
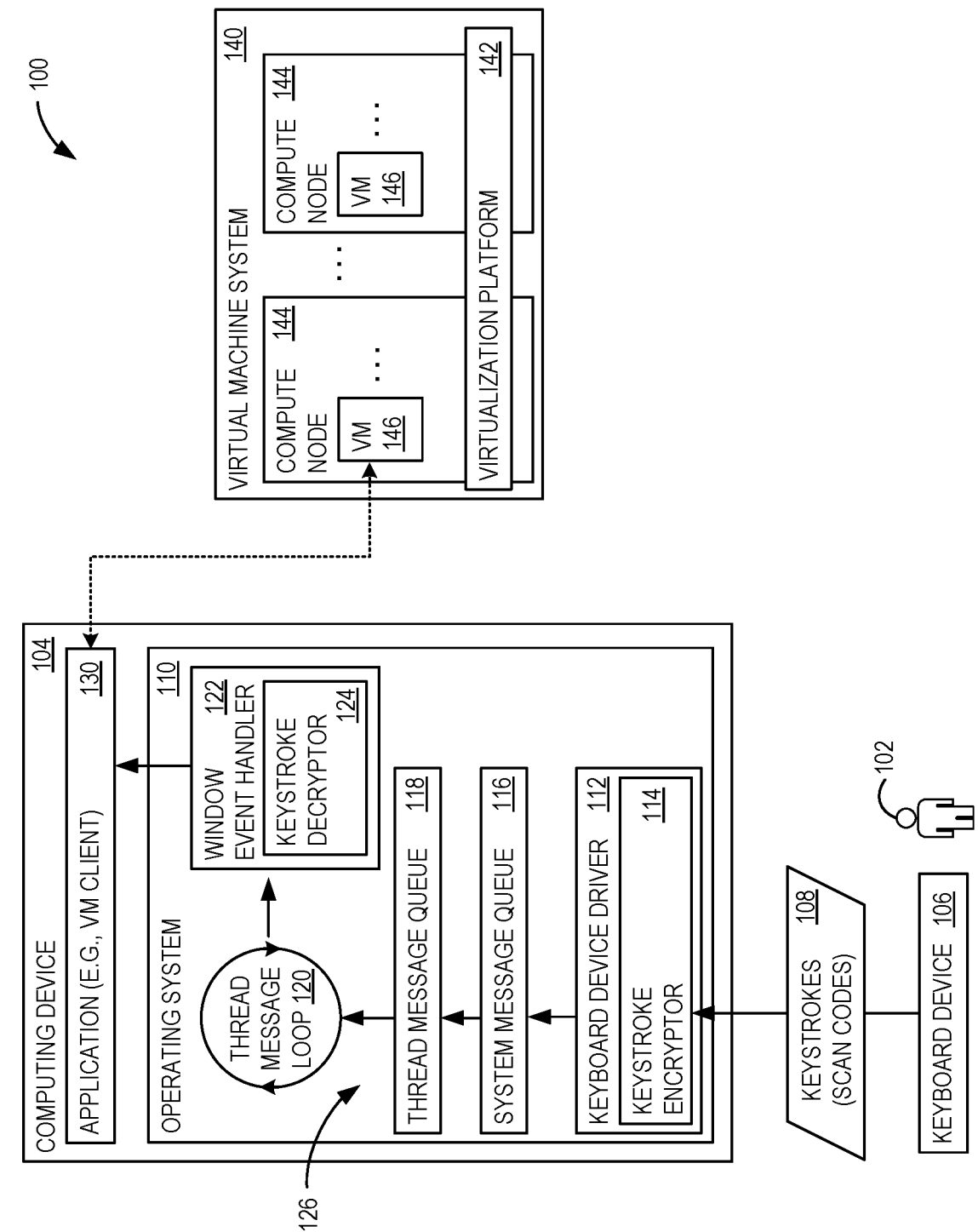
FIG. 1 illustrates an example architecture that advantageously provides encryption and decryption of keystroke data.

FIG. 1 illustrates an example architecture 100 that advantageously provides encryption and decryption of keystroke data. Architecture 100 uses a computing device 104 in conjunction with a keyboard device 106 which may be implemented on one or more computing apparatus 518 of FIG. 5. A keystroke encryptor 114 encrypts keystrokes 108 (e.g., scan codes, virtual-key codes, or the like), thus encrypting the keystrokes 108 as the keystroke data is passed through a keystroke I/O message channel 126, such as a channel native to, or otherwise part of, an operating system 110 of the computing device. In the example shown in FIG. 1, the operating system 110 is a version of MICROSOFT WINDOWS (Microsoft Corporation, Redmond, Washington). In other examples, the client operating system 110 is another operating system such as another desktop or server-based operating system (e.g., MACOS (Apple Inc., Cupertino, California), CHROMEOS (Google LLC, Mountain View, California), Unix, Linux, or the like)

or a mobile operating system (e.g., Android, IOS (Apple, Inc.), CHROMEOS, or the like).

In operation, a user 102 operates the keyboard device 106 as an input device to the computing device 104. In some examples, the computing device 104 is a desktop or laptop computer and the keyboard device is a physical keyboard device, such as a QWERTY keyboard device or a French AZERTY keyboard device connected via a wired or wireless connection with the computing device 104. In other examples, the computing device 104 is a mobile computing device and the keyboard device 106 is a virtual keyboard device (e.g., a keyboard displayed on a touch screen of a mobile device).

Each time a key on the keyboard device 106 is pressed (and, in some configurations, released) by the user 102, the keyboard device 106 transmits keystroke data (e.g., keystrokes 108, in the form of scan codes or the like generated by the keyboard device 106) to a keyboard device driver 112 of the client operating system 110. Each keystroke 108 can include a scan code, a unique value that identifies which particular key was pressed or released during a given input event (e.g., independent of an active keyboard layout being used by the client operating system 110).

In conventional architectures, the keyboard device driver 112 interprets the scan code and converts the scan code to a virtual-key code, a device-independent value defined by the computing device 104 that identifies a particular purpose of each key. The keyboard device driver 112 then creates a keystroke message that includes the scan code (in plaintext form) and transmits that message through the keystroke I/O message channel 126. This message channel 126 includes a system message queue 116, a thread message queue 118, and a thread message loop 120 that are collectively configured to deliver keystroke messages to applications 130 running on the computing device 104 via a window event handler 122 (e.g., window procedure under Microsoft Windows, a window event handling function under Linux or macOS, or the like). However, keyloggers can inspect keystroke messages as the messages pass through the channel 126, and thus the plaintext keystroke data is vulnerable to being read and inspected in such conventional architectures.

In contrast, the keyboard device driver 112 includes a keystroke encryptor 114 that is configured to encrypt the keystroke data as the keystroke message transits the keystroke I/O message channel 126 through to the window event handler 122, where a keystroke decryptor 124 is configured to decrypt the keystroke data before the window event handler 122 passes each keystroke on to some particular application 130. More specifically, a key identifier (e.g., a particular scan code or virtual-key code of a particular keystroke 108) is included in a cipher segment that is encrypted by the encryptor 114. This cipher segment (in encrypted form) is included as one field of a keystroke message, and another field that typically includes the plaintext key identifier is left empty (e.g., does not include the plaintext key identifier). As such, the cipher segment accompanies the keystroke message through the message channel 126 in an encrypted form, and any keylogger operating between the keyboard device driver 112 and the window event handler 122 can at best read an empty key identifier field of the message or an encrypted cipher segment.

Upon arrival at the window event handler 122, the keystroke decryptor 124 decrypts the cipher segment embedded in the keystroke message, thus identifying the key identifier (in plaintext). The window event handler 122 passes the plaintext key identifier to the application 130 as an input event to be processed by the application 130.

The application 130 may be any application, including virtualized and non-virtualized. In some examples, the application 130 is a virtual machine (VM) client that is configured to connect and communicate with a virtual machine 146 of a virtual machine system 140. The virtual machine system 140 provides a virtualization architecture that comprises of a set of compute nodes 144, where each compute node hosts multiple objects, which may be virtual machines 146 (e.g., VMs, such as base objects, linked clones, and independent clones), containers, applications, or any compute entity (e.g., computing instance or virtualized computing instance) supported by a virtualization platform 142.

Figure 2:
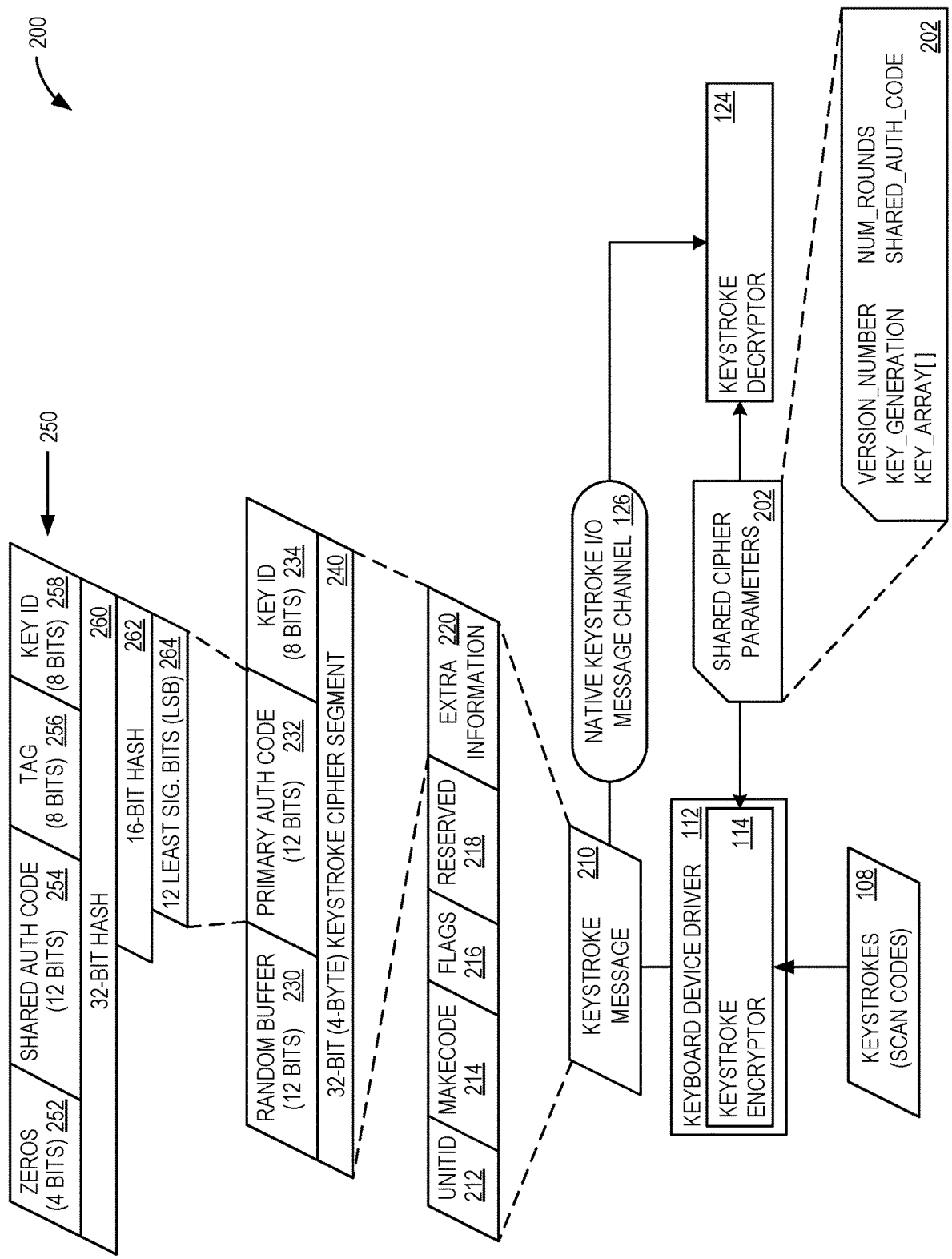
FIG. 2 illustrates an example data flow of a keystroke message through a native keystroke I/O message channel, such as the example shown in FIG. 1.

FIG. 2 illustrates an example data flow 200 of a keystroke message 210 through the native keystroke I/O message channel 126 shown in FIG. 1. A keystroke 108 is received by the keystroke encryptor 114. In some examples, the keystroke 108 includes a key identifier comprising a scan code (e.g., an 8-bit integer generated by the keyboard device 106 of FIG. 1). In some examples, the key identifier comprises a virtual-key code (e.g., an 8-bit integer that is the results of a mapping of a scan code to the virtual-key code by the keyboard device driver 112). The keyboard device driver 112 generates a keystroke message 210 for each keystroke 108 that is received. In this example, the keystroke encryptor 114 generates and encrypts a keystroke cipher segment 240 that is embedded within the keystroke message 210 before the keystroke message 210 is sent through the message channel 126.

In the example shown in FIG. 2, the message channel 126 is a keystroke I/O message channel 126 native to certain versions of the Windows operating system. As such, the keystroke message 210 includes several predefined fields as a part of a message protocol for the message channel 126, including a Unit ID field 212 (as a USHORT of 2 bytes), a MakeCode field 214 (USHORT), a Flags field 216 (USHORT), a Reserved field 218 (USHORT), and an ExtraInformation field 220 (as a ULONG of 4 bytes) (e.g., as defined by a "KEYBOARD_INPUT_DATA" object or structure. The MakeCode field 214 typically includes the key identifier (in plaintext) in unencrypted implementations. In encrypted implementations described herein, the MakeCode field 214 is intentionally left empty (zero value) and the key identifier is embedded as a key ID field 234 within a keystroke cipher segment 240 and that keystroke cipher segment is encrypted and included as the ExtraInformation field 220. The ExtraInformation field 220 thus represents a data channel between the keyboard device driver 112 and the window event handler 122 that is used to pass the key ID 234 in an encrypted state.

More specifically, and in a first example implementation, the keystroke encryptor 114 creates a 32-bit (4 bytes) keystroke cipher segment (or just "cipher segment") 240 that includes a random buffer field (or just "random buffer") 230 of 12 bits, a primary authentication code field (or just "primary auth code") 232 of 12 bits, and a key ID field (or just "key ID") 234 of 8 bits. The key ID 234, as mentioned above, is the plaintext key identifier received in the keystroke 108 (e.g., a scan code or virtual-key code mapped from the scan code). The random buffer 230 is a random 12 bits of data used to pad the size of the cipher segment 240 to be 32 bits (4 bytes), the size of the ExtraInformation field 220. The primary auth code 232 is a random number generated and shared between the encryptor 114 and the decryptor 124 as a part of shared cipher parameters 202 (SHARED_AUTH_CODE). As such, in this first example implementation, the primary auth code 232 is consistently used for all keystroke messages 210 between the encryptor 114 and the decryptor 124 (until the shared cipher parameters 202 are reset and renegotiated). This first example implementation is referred to herein as a "static authentication code" implementation. The primary auth code 232 is used by the decryptor 124 to authenticate that the keystroke message 210 was properly generated by the encryptor 114. While the random buffer field 230 and primary auth code field 232 are set to 12 bits in size in the example implementation, it should be understood that other widths between these two fields are possible (from 24 total bits), where more bits to the random buffer field 230 makes the cipher more secure against certain types of attacks (e.g., chosen-plaintext attack), and where more bits to the primary auth code field 232 provides a greater chance to detect faked ciphertext. Further, the fields 230, 233, 234 of the cipher segment 240 can be in any arbitrary order.

In a second example implementation, the primary auth code 232 differs from the first example implementation. This second example implementation is referred to herein as a "dynamic authentication code" implementation. More specifically, the primary auth code 232 is a 12-bit value that is generated for each particular keystroke message 210 in this second implementation. To create the primary auth code 232, the encryptor 114 creates a hash segment 250, a 32-bit value that includes a zeros field 252 of 4 bits, a shared auth code field 254 of 12 bits, a tag field (or just "tag") 256 of 8 bits, and a key ID field 258 of 8 bits. The zeros field is set to all zeros. The shared auth code field 254 is the shared authentication code, SHARED_AUTH_CODE, from the shared cipher parameters 202. The tag field 256 is an 8-bit value that is used to help verify whether the MakeCode field 214 of the keystroke message 210 has been tampered with or otherwise changed between encryption and decryption. The encryptor 114 selects a tag value for the tag field 256 (e.g., a random 8-bit value, an incrementing value, or the like). This tag value is also included as the MakeCode field 214 in the keystroke message 210 (in plaintext, zero padded). The encryptor 114 hashes the hash segment (e.g., using "triple32" hash function, or any other hash method that takes 32 bits as input and produces 32 bit hash values) to generate a 32-bit hash 260. This 32-bit hash 260 is converted into a 16-bit hash 262 (e.g., using XOR-folding). The lower 12 bits 264 of the 16-bit hash 262 are then used as the primary auth code 232 within the keystroke cipher segment 240 prior to encryption. The fields 252, 254, 256, 258 of the hash segment 250 can be in any arbitrary order.

In operation, the encryptor 114 creates the keystroke cipher segment 240 with either the first or second implementations as described above. The encryptor 114 then encrypts the cipher segment 240 using an encryption algorithm that can support encryption of a 4-byte message. In example implementations, the encryptor 114 uses Simon32 to encrypt 7 the cipher segment 240. Simon32 is a variant of the Simon family of lightweight block ciphers made publicly available by the National Security Agency (NSA) and that supports 32-bit blocks. In other implementations, another block cipher that supports 32-bit blocks is used, such as RC5, Skip32, Spec32, or the like. The encrypted cipher segment 240 is included as the ExtraInformation field 220 of the keystroke message 210. As discussed above, the MakeCode field is empty in the static auth code implementation and is set to the tag value in the dynamic auth code implementation.

Upon receipt of the keystroke message 210, the decryptor 124 extracts the encrypted cipher segment 240 from the ExtraInformation field 220, and optionally the tag value from the MakeCode field 214. The decryptor 124 then decrypts the encrypted cipher segment 240 (using the shared cipher parameters). In the first example embodiment, if the decrypted primary auth code 232 matches the SHARED_AUTH_CODE from the shared cipher parameters 202, then the message 210 is determined to be authentic, and thus the key ID 234 is extracted and passed along by the window event handler 122 to the active application 130. In the second example embodiment, the decryptor 124 verifies the message 210 by recreating the hash segment 250. In recreating the hash segment 250, zeros field is created with all zeros, the SHARED_AUTH_CODE is used for the shared auth code field 254, the value from the MakeCode field 214 of the message 210 is used as the tag field 256, and the unencrypted key ID field 234 of the cipher segment 240 is used as the key ID field 258. The resulting 32-bit hash 260 is converted to a 16-bit hash 262, and the lower 12 bits 264 are then compared to the primary auth code 232 from the unencrypted cipher segment 240. If these values match, then the message 210 is considered authentic (properly decrypted and a verified untampered MakeCode field), and thus the unencrypted key ID 234 is similarly extracted and passed along to the active application 130.

In example implementations, the shared cipher parameters 202 include a VERSION_NUMBER indicating a version of the encryption system, a KEY_GENERATION value indicating a counter identifying how many times the encryption system has regenerated, reset, or recreated some of these parameters, a KEY_ARRAY array of 32 64-bit keys (under Simon32) used by the encryption algorithm to perform encryption and decryption, a NUM_ROUNDS value of a random integer between 16 and 32, and a SHARED_AUTH_CODE whose use is described above. Other shared cipher parameters 202 may be included. The encryptor 114 and decryptor 124 share these cipher parameters 202 via some separate communications channel and periodically regenerate, reset, or recreate some of these parameters 202. For example, a reset event is initiated or performed by either of the encryptor 114 and decryptor 124 after a predetermined period of time (e.g., reset event automatically initiated every five minutes) or after a predetermined number of encryptions (e.g., reset event automatically initiated after every 1024 encryptions, as tracked internally by the encryptor), where quicker resets yields stronger security, but at a cost of computational processing.

In some implementations, the decryptor 124 maintains both a current set of cipher parameters 202 and a previous set of cipher parameters. There may be situations in which a new set of cipher parameters 202 may have been created and shared but some messages 210 that had been encrypted with the previous version of cipher parameters 202 may still be inbound to the decryptor 124. As such, if a decryption attempt fails with the current parameters 202, then the decryptor 124 may attempt to decrypt with the prior set of parameters 202, and only then may reject a message 210 if neither set of parameters 202 successfully authenticates the message 210.

Figure 3A:
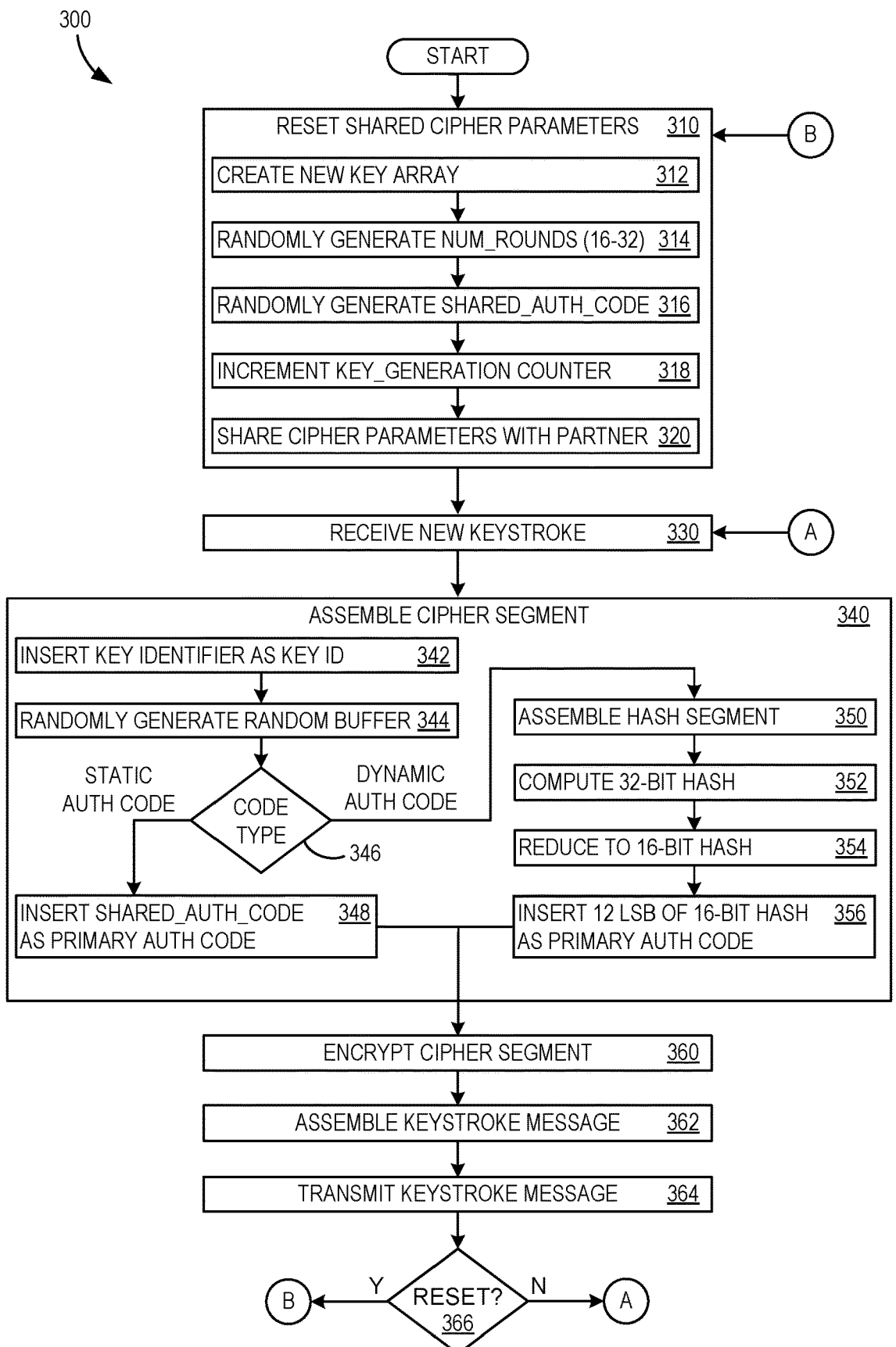
FIG. 3A and FIG. 3B illustrate a flowchart of exemplary operations associated with an example architecture, such as that shown in FIG. 1.
Figure 3B:
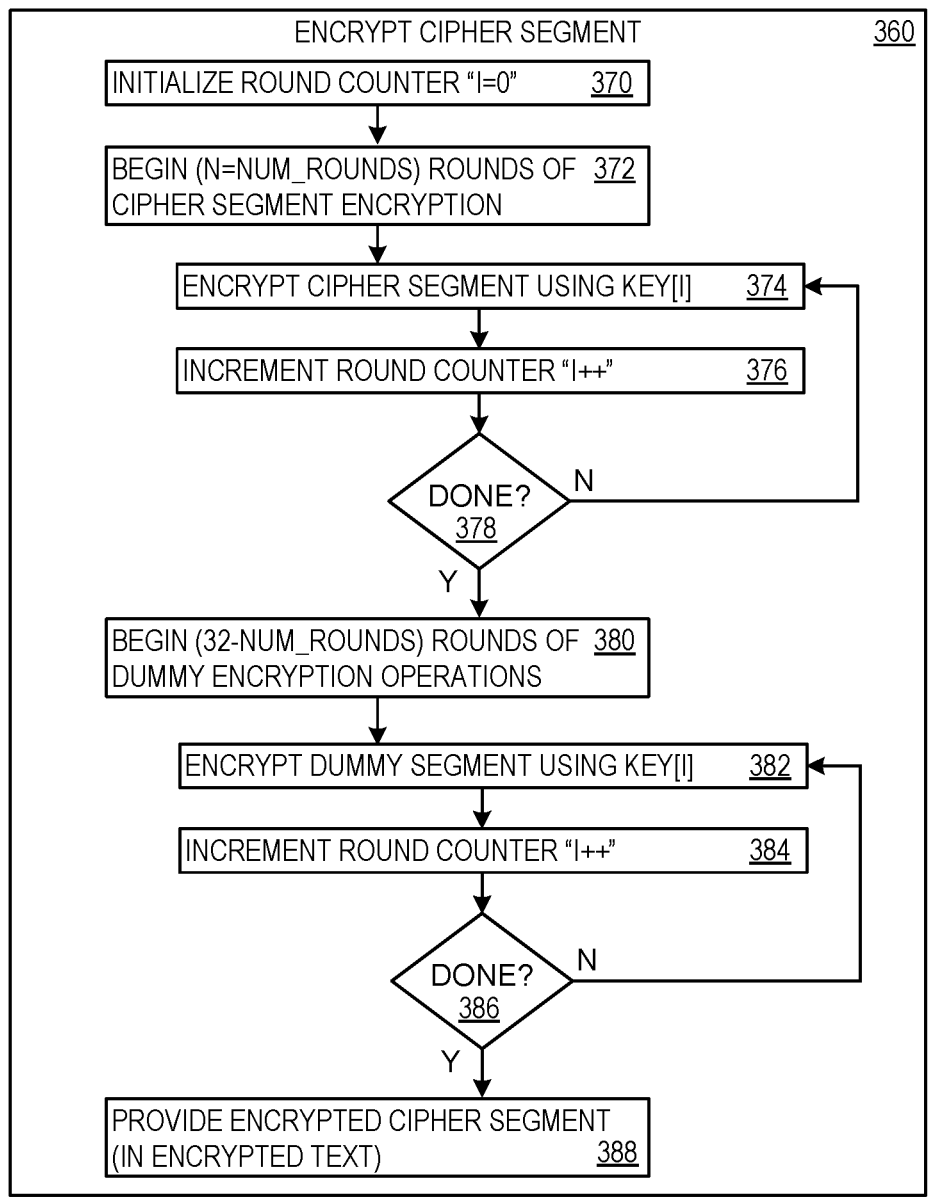

FIG. 3A and FIG. 3B illustrate a flowchart 300 of exemplary operations associated with architecture 100 shown in FIG. 1. In some examples, the operations of flowchart 300 are performed by the keystroke encryptor 114 executing on the computing device 104 of FIG. 1 or the computing apparatus 518 of FIG. 5. Referring now to FIG. 3A, flowchart 300 commences with the encryptor 114 resetting a set of shared cipher parameters at operation 310, such as the shared cipher parameters 202 of FIG. 2. Resetting the shared cipher parameters at operation 310 includes creating a new key array at operation 312. In an example implementation, the keystroke encryptor 114 uses Simon32 encryption algorithm during encryption and decryption operations. This encryption algorithm uses a set of N=32 64-bit keys stored as KEY_ARRAY[ ]. Each key of the KEY_ARRAY[ ] is configured as a 64-bit value randomly generated by the encryptor 114 for implementations using Simon32. Other encryption algorithms may use keys of different key length. The encryptor 114 also randomly generates a NUM_ROUNDS value at operation 314, which is created as an integer value between 16 and 32. In other implementations, the range of NUM_ROUNDS can have a lower minimum or maximum (for faster encryption, but at a reduced encryption strength) or a higher minimum or maximum (for slower encryption, but at a higher encryption strength). The number of keys in the KEY_ARRAY[ ] is configured to be the maximum of the range of NUM_ROUNDS. A SHARED_AUTH_CODE is also randomly generated at operation 316. The SHARED_AUTH_CODE is a 12-bit value that is used as an authentication code for messages passed between the encryptor 114 and the decryptor 124. At operation 318, a KEY_GENERATION counter is incremented. This KEY_GENERATION counter tracks how many times the cipher parameters 202 have been recreated and resynchronized between the encryptor 114 and decryptor 124. At operation 320, the encryptor 114 shares the new set of cipher parameters with the decryptor 124. While the example flowchart 300 describes the operation 310 as being performed by the encryptor 114, it should be understood that this operation 310 can alternatively be performed by the decryptor 124 or by some other coordination application (not shown).

At operation 330, the encryptor 114 receives a new keystroke 108 from the keyboard device 106. The keystroke data included in keystroke 108 includes a key identifier associated with a key press or release event that has occurred on the keyboard device. This key ID may be a scan code or a virtual-key code. For each new keystroke 108 received at operation 330, the encryptor 114 assembles a cipher segment 240 that will be included in a new keystroke message 210 to be sent to the decryptor 124. Initially, the encryptor 114 assembles a cipher segment 240 at operation 340. Assembling the cipher segment 240 includes inserting the key ID into the key ID field 234 of the cipher segment 240 at operation 342. At operation 344, the encryptor 114 randomly generates a 12-bit random value and includes this value as the random buffer field 230 of the cipher segment 240.

At decision operation 346, the encryptor 114 determines whether to use static authentication codes or dynamic authentication codes, which can be a configuration setting shared between the encryptor 114 and decryptor 124. When the encryptor 114 is configured to use static authentication codes, the cipher segment assembly of operation 340 continues to operation 348 and inserts the SHARED_AUTH_CODE into the primary auth code field 232 of the cipher segment 240. When the encryptor 114 is configured to use dynamic authentication codes, the cipher segment assembly of operation 340 continues to operations 350-356, which generates a 12-bit dynamic authentication code for use as the primary authentication code field 232. More specifically, at operation 350, the encryptor 114 assembles a 32-bit hash segment 250. This hash segment assembly includes inserting the key ID as the key ID field 258, the SHARED_AUTH_CODE as the shared auth code field 254, an 8-bit tag value as the tag field 256, and 4 bits of zero padding in the zeros field 252. At operation 352, the encryptor 114 computes a 32-bit hash 260 by hashing the hash segment 250 using a hash function such as "triple32." At operation 354, the 32-bit hash 260 is reduced to a 16-bit hash 262 by performing XOR-folding (or another reduction method) on the 32-bit hash 260. At operation 356, the encryptor 114 inserts the 12 least significant bits of the 16-bit hash 262 into the primary auth code field 232 of the cipher segment 240. As such, the assembly of the cipher segment of operation 340 is complete, though currently in an unencrypted, plaintext state.

At operation 360, the encryptor 114 encrypts the cipher segment 240. This encryption operation 360 is illustrated in greater detail in FIG. 3B. Referring now to FIG. 3B, at operation 370, the encryptor 114 initializes a round counter "I=0." This round counter, I, is used to track a number of rounds of encryption that have been performed on the cipher segment 240. At operation 372, the encryptor 114 begins a loop that causes N=NUM_ROUNDS of encryption of the cipher segment 240. Since NUM_ROUNDS is some random value between 16 and 32, this loop of operations 374-378 will be performed between 16 and 32 times, transforming the initially-plaintext cipher segment 240 into an encrypted cipher segment. At operation 374, and at each iteration I=0 to (N−1), the current cipher segment 240 is encrypted using key[I] of the KEY_ARRAY[ ] using Simon32 encryption. As such, each operation 374 inputs a 32-bit current cipher segment and outputs a 32-bit encrypted cipher segment, which becomes the new current cipher segment 240. At operation 376, the round counter/is incremented. At decision operation 378, the encryptor 114 determines whether the loop began at operation 372 is complete, namely whether I=(N−1). If the loop is not yet complete, the encryptor 114 returns to operation 374 for another iteration.

When the primary encryption loop of operations 372-378 is complete, the cipher segment 240 has been completely encrypted. The encryptor 114 may perform one or more dummy encryption operations (to protect against side channel attacks). These dummy encryption operations of a dummy encryption loop 380-386 do not operate on the encrypted cipher segment 240. Rather, the dummy encryption operations may be performed on a dummy 32-bit segment, thus performing encryption processing but not altering the already-encrypted cipher segment 240. More specifically, at operation 380, the encryptor 114 begins the dummy encryption loop by determining a number of rounds (32−NUM_ROUNDS) to loop. If the primary encryption loop 372-378 already performed 32 encryption operations on the cipher segment 240 (I=32−1), then no dummy encryption operations are needed, and thus the encryptor 114 skips down to operation 388. Otherwise, if there is at least one dummy encryption operation to be performed (1<32−1), then at operation 382, the encryptor 114 performs an encryption operation on the dummy segment using key[I], similar to operation 374. At operation 384, the round counter/is incremented. At decision operation 386, the encryptor 114 determines whether the dummy encryption loop 380-386 is complete, namely whether/=32−1. If the loop is not yet complete, the encryptor 114 returns to operation 382 for another iteration of dummy encryption. When the dummy encryption loop 380-386 is complete, the encryptor 114 has completed 32 rounds of encryption, of which (NUM_ROUNDS) were performed on the cipher segment 240, yielding the encrypted cipher segment, and (32−NUM_ROUNDS) were performed on the dummy segment. At operation 388, the encryptor 114 provides the encrypted cipher segment 240 (now in encrypted text) as the output of operation 360.

Referring again to FIG. 3A, once the encrypted cipher segment 240 has been generated, the encryptor 114 assembles a keystroke message 210 at operation 362.

Assembling the keystroke message 210 includes inserting the 32-bit encrypted cipher segment 240 into the ExtraInformation field 220. Further, the encryptor 114 also modifies the MakeCode field 214. In static auth code implementations, the MakeCode field is erased (all zero-bits) or is otherwise overwritten with a random value. In dynamic auth code implementations, the tag value used in the tag field 254 is inserted as the value of the MakeCode field. In such dynamic auth code implementations, the tag value will be read from the MakeCode field and used to authenticate the dynamic authentication code, as discussed in greater detail below. The other fields of the keystroke message 210 may be populated with other data, but remain unchanged by the encryptor 114, as they do not impact the encryption and decryption operations described herein. At operation 364, the assembled keystroke message 210 is transmitted through the message channel 126, bound for the decryptor 124.

At decision operation 366, the encryptor 114 determines whether to reset the shared cipher parameters 202 between the encryptor 114 and decryptor 124. For example, the encryptor 114 is configured to reset the cipher parameters 202 when a predetermined amount of time has passed since the last reset (e.g., a reset every five minutes), or after a predetermined number of keystroke messages 210 have been encrypted (e.g., a reset after every 1,024 encrypted keystroke messages 210). In some implementations, the decryptor 124 is configured to trigger a reset if a predetermined number of encrypted keystroke messages 210 fail to be properly decrypted and authenticated (e.g., reset after three failed decryptions). While the examples provided herein describe the encryptor 114 performing the computation operations of the reset operation 310, it should be understood that any or all of those operations 310 may be performed by the decryptor 124, and either or both of the encryptor 114 and decryptor 124 may be configured to trigger a reset operation 310. When a reset is triggered, the encryptor 114 re-performs operation 310 and associated sub-operations 312-320, thereby causing a new set of cipher parameters 202 to be shared between the encryptor 114 and decryptor 124. Otherwise, the encryptor 114 returns to operation 330 to receive and process the next keystroke 108.

Figure 4A:
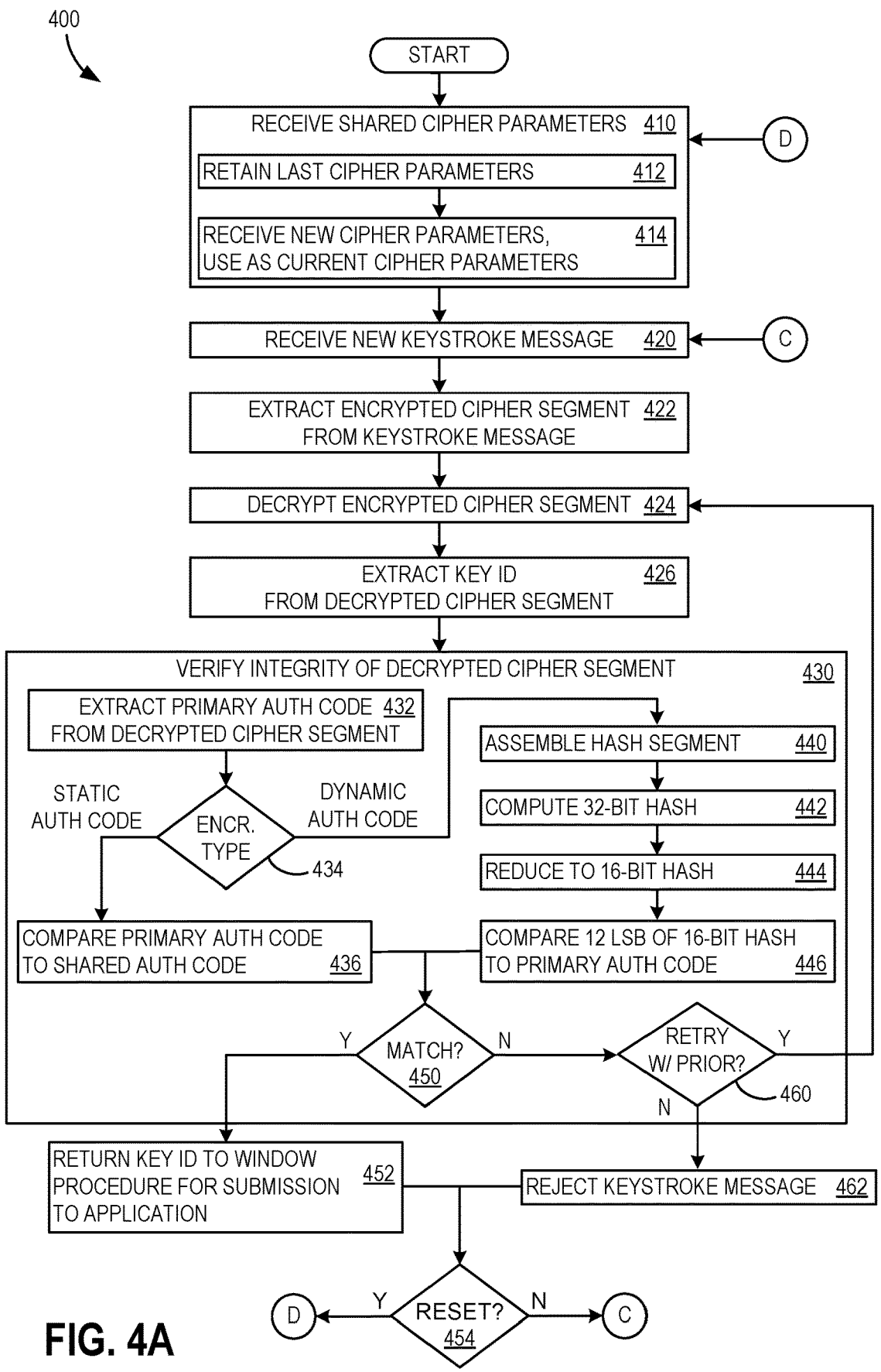
FIG. 4A and FIG. 4B illustrate a flowchart of exemplary operations associated with example architecture, such as that shown in FIG. 1.
Figure 4B:
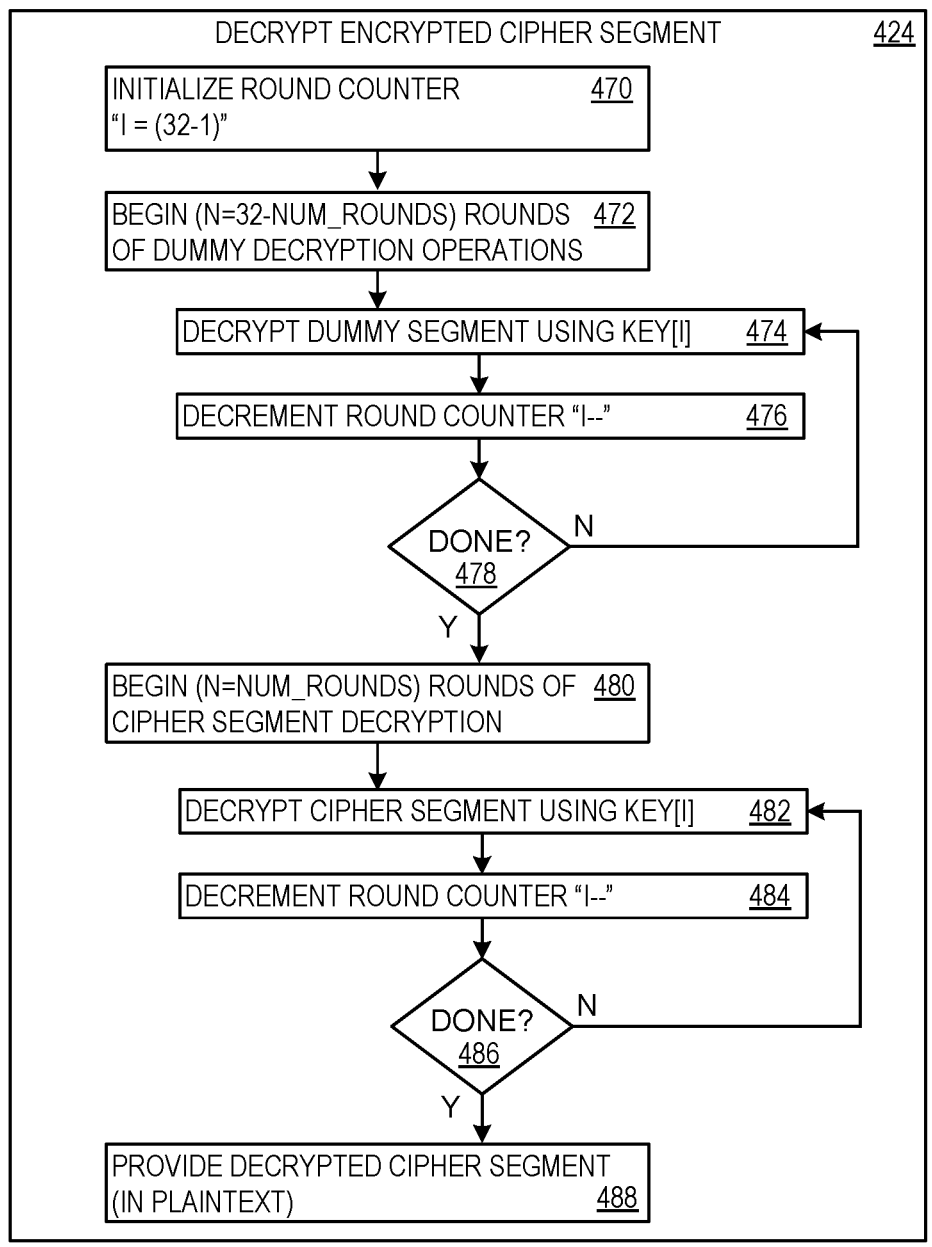

FIG. 4A and FIG. 4B illustrate a flowchart 400 of exemplary operations associated with architecture 100 shown in FIG. 1. In some examples, the operations of flowchart 400 are performed by the keystroke decryptor 124 executing on the computing device 104 of FIG. 1 or the computing apparatus 518 of FIG. 5. Referring now to FIG. 4A, flowchart 400 commences with the decryptor 124 receiving the shared cipher parameters 202 at operation 410. In the example implementation, the decryptor 124 keeps two copies of cipher parameters, a current set and a prior set (not separately shown). At operation 412, when a reset is triggered, the decryptor 124 copies the current cipher parameters 202 into a prior cipher parameters, thereby retaining the last version of cipher parameters. At operation 414, the decryptor 124 also receives new cipher parameters and uses these new cipher parameters as the current cipher parameters 202.

At operation 420, the decryptor 124 receives a new keystroke message 210 from the message channel 126. At operation 422, the encrypted cipher segment 240 is extracted from the ExtraInformation field 220 of the keystroke message 210. At operation 424, the decryptor 124 decrypts the encrypted cipher segment 240. This decryption operation 424 is illustrated in greater detail in FIG. 4B.

Referring now to FIG. 4B, at operation 470, the decryptor 124 initializes a round counter "I=32−1." This round counter, I, is similarly used to track a number of rounds of decryption that have been performed, either on the cipher segment 240 or on a dummy segment, for a total of 32 decryption operations. The decryptor 124 may perform one or more dummy decryption operations (to protect against side channel attacks). These dummy decryption operations of a dummy encryption loop 472-478 do not operate on the encrypted cipher segment 240. Rather, the dummy decryption operations may be performed on a dummy 32-bit segment, thus performing decryption processing but not altering the encrypted cipher segment 240. More specifically, at operation 472, the decryptor 124 begins a loop that causes N=32−NUM_ROUNDS of decryption of the dummy segment. Since NUM_ROUNDS is some random value between 16 and 32, this loop of dummy decryption operations 474-478 will be performed between 0 and 16 times. At operation 474, and at each iteration/=(32−1) to (32−NUM_ROUNDS−1), the dummy segment is decrypted using key[I] of the KEY_ARRAY[ ] using Simon32 encryption. At operation 476, the round counter/is decremented. At decision operation 478, the decryptor 124 determines whether the loop began at operation 472 is complete, namely whether I<32−NUM_ROUNDS−1. If the loop is not yet complete, the decryptor 124 returns to operation 374 for another iteration.

When the dummy decryption loop of operations 472-478 is complete, the decryptor 124 begins to decrypt the encrypted cipher segment 240. More specifically, at operation 480, the decryptor 124 begins the cipher segment decryption loop by determining a number of rounds (N=NUM_ROUNDS) to loop. At operation 482, and at each iteration/=(32−NUM_ROUNDS−1) to 0, the encrypted cipher segment 240 is decrypted using key[I] of the KEY_ARRAY[ ] using Simon32 encryption. At operation 484, the round counter/is decremented. At decision operation 486, the decryptor 124 determines whether the dummy encryption loop 480-486 is complete, namely whether I<0. If the loop is not yet complete, the decryptor 124 returns to operation 482 for another iteration of cipher segment decryption. When the cipher segment decryption loop 480-486 is complete, the decryptor 124 has completed 32 rounds of decryption, of which (NUM_ROUNDS) were performed on the cipher segment 240, yielding the decrypted cipher segment, and (32−NUM_ROUNDS) were performed on the dummy segment. At operation 488, the decryptor 124 provides the decrypted cipher segment 240 (now in plaintext) as the output of operation 424.

Referring again to FIG. 4A, once the decrypted cipher segment 240 has been generated, the decryptor 124 extracts the key ID from the key ID field 234 of the decrypted cipher segment 240 at operation 426. At operation 430, the decryptor 124 verifies the integrity of the keystroke message 210 using the decrypted cipher segment. Verifying the message integrity includes extracting the primary auth code from the decrypted cipher segment 240 at operation 432. At decision operation 434, the decryptor 124 branches based on the type of auth code in use. When static auth codes are being used, the decryptor 124 compares the primary auth code 232 to the SHARED_AUTH_CODE of the current cipher parameters 202 at operation 436. When dynamic auth codes are being used, the integrity verification of operation 430 continues to operations 440-446, which generates a 12-bit dynamic authentication code for use in authenticating the keystroke message 210. More specifically, at operation 440, the decryptor 124 assembles a 32-bit hash segment similar to the hash segment 250 shown in FIG. 2. This hash segment assembly includes inserting the key ID extracted from the key ID field 234 of the decrypted cipher segment 240 as the key ID field 258, inserting the SHARED_AUTH_CODE as the shared auth code field 254, inserting the 8-bit tag value (extracted from the MakeCode field 214 of the keystroke message 210) as the tag field 256, and 4 bits of zero padding in the zeros field 252. At operation 442, the decryptor 124 computes a 32-bit hash 260 by hashing the hash segment 250 using a hash function such as "triple32." At operation 444, the 32-bit hash 260 is reduced to a 16-bit hash 262 by performing XOR-folding (or other reduction method) on the 32-bit hash 260. At operation 446, the decryptor 124 compares the 12 least significant bits of the 16-bit hash 262 to the primary auth code field 232 of the unencrypted cipher segment 240.

At decision operation 450, the decryptor 124 thus determines whether the keystroke message 210 is authentic, namely whether the primary auth code matches the SHARED_AUTH_CODE (in static auth code implementations) or whether the primary auth code matches the 12 LSBs of the 16-bit hash 262 (in dynamic auth code implementations). When the keystroke message 210 is determined to be authentic, the decryptor 124 returns the key ID from the key ID field 234 of the decrypted cipher segment 240 to the window event handler 122 for submission to the application 130 at operation 452. When the keystroke message 210 is determined to not be authentic, then the decryptor 124 may attempt to decrypt the encrypted cipher segment 240 using the prior set of cipher parameters (as retained in operation 412). As such, at decision operation 460, the decryptor 124 returns to repeat operations 424-450, but using the prior set of cipher parameters to decrypt the encrypted cipher segment 240 (rather than the current set). Such a retry allows the decryptor 124 to potentially catch and successfully decrypt keystroke messages that had been generated before the latest reset, but that had not yet been received and processed by the decryptor 124 (when the prior cipher parameters where then the current cipher parameters).

If, at decision operation 460, it is determined that a retry was already attempted and failed with the prior cipher parameters, then the decryptor 124 rejects the keystroke message 210 at operation 462. At decision operation 454, the decryptor 124 determines whether a reset has been triggered (either by the decryptor 124 or by the encryptor 114). In some implementations, a failure of a predetermined number of keystroke messages 210 during decryption causes the decryptor 124 to initiate a reset. If a reset has been triggered, the decryptor 124 returns to operation 410 to receive new cipher parameters. Otherwise, the decryptor 124 returns to operation 420 and prepares to receive the next keystroke message 210 for decryption.

Additional Examples

An example method of encrypting keystroke data comprises: receiving, by a keyboard device driver of the computing device, a key identifier (ID) from a keyboard device, the key ID representing a keystroke event occurring on the computing device via the keyboard device; creating a keystroke cipher segment comprising a primary authentication code and the key ID; encrypting the keystroke cipher segment to generate an encrypted keystroke cipher segment; creating a keystroke message comprising at least the encrypted keystroke cipher segment; transmitting the keystroke message from the keyboard device driver to a window event handler via an input/output (I/O) message channel native to an operating system running on the computing device, the window event handler being responsible for providing keystroke data to applications running on the operating system; receiving the keystroke message at the window event handler; decrypting the encrypted keystroke cipher segment, thereby identifying the key ID; and transmitting the key ID to a first application.

An example computer system comprises: a keyboard device; a processor; and a non-transitory computer readable medium having stored thereon program code executable by the processor, the program code causing the processor to: receive, by a keyboard device driver managing the keyboard device, a key identifier (ID) from the keyboard device, the key ID representing a keystroke event occurring on the computing device via the keyboard device; create a keystroke cipher segment comprising a primary authentication code and the key ID; encrypt the keystroke cipher segment to generate an encrypted keystroke cipher segment; create a keystroke message comprising at least the encrypted keystroke cipher segment; transmit the keystroke message from the keyboard device driver to a window event handler via an input/output (I/O) message channel native to an operating system running on the computer system, the window event handler being responsible for providing keystroke data to applications running on the operating system; receive the keystroke message at the window event handler; decrypt the encrypted keystroke cipher segment, thereby identifying the key ID; and transmit the key ID to a first application.

An example non-transitory computer storage medium has stored thereon program code executable by a processor, the program code embodying a method comprising: receiving, by a keyboard device driver, a key identifier (ID) from a keyboard device, the key ID representing a keystroke event occurring on the computing device via the keyboard device; creating a keystroke cipher segment comprising a primary authentication code and the key ID; encrypting the keystroke cipher segment to generate an encrypted keystroke cipher segment; creating a keystroke message comprising at least the encrypted keystroke cipher segment; transmitting the keystroke message from the keyboard device driver to a window event handler via an input/output (I/O) message channel native to an operating system, the window event handler being responsible for providing keystroke data to applications running on the operating system; receiving the keystroke message at the window event handler; decrypting the encrypted keystroke cipher segment, thereby identifying the key ID; and transmitting the key ID to a first application.

Another example computer system comprises: a processor; and a non-transitory computer readable medium having stored thereon program code executable by the processor, the program code causing the processor to perform a method disclosed herein. Another example non-transitory computer storage medium has stored thereon program code executable by a processor, the program code embodying a method disclosed herein.

Alternatively, or in addition to the other examples described herein, examples include any combination of the following:
    installing and executing a keystroke encryption module in conjunction with a keyboard device driver;
    installing and executing a keystroke decryption module in conjunction with a window event handler;
    resetting shared cipher parameters;
    creating new key arrays for Simon32 encryption (or other 32 bits block encryption algorithms);
    randomly generating a number between 16 and 32 to run Simon32 encryption (or other 32 bits block encryption algorithms) that number of times;

incrementing a counter configured to count a number of times keys have been generated;
sharing cipher parameters between partner encryption module and decryption module;
receiving a new keystroke that includes keystroke data;
receiving keystroke data that includes one or more of a scan code and a virtual-key code;
inserting one or more of a key identifier, a randomly generated value, and an authentication code in a plaintext cipher segment;
assembling a hash segment that includes one or more of: any number of zeros, an authentication code, a tag value, and a key identifier;
hashing a data segment using triple32 (or other hash algorithms that give a 32 bits result);
XOR-folding a data segment (or other folding method);
using a number of least significant bits of a data segment as an authentication code;
encrypting a cipher segment;
embedding an encrypted cipher segment as any field in a keystroke message;
transmitting a keystroke message through a keystroke I/O message channel native to an operating system;
performing one or more dummy encryption operations;
retaining two or more copies of the most recent cipher parameters;
receiving a key identifier (ID) from a keyboard device, the key ID representing a keystroke event occurring on the computing device via the keyboard device;
creating a keystroke cipher segment comprising a primary authentication code and a key ID;
encrypting a keystroke cipher segment to generate an encrypted keystroke cipher segment;
creating a keystroke message comprising at least a encrypted keystroke cipher segment;
transmitting a keystroke message from a keyboard device driver to a window event handler via an input/output (I/O) message channel native to an operating system running on the computing device;
an operating system including one of Microsoft Windows, Apple MacOS, Google ChromeOS, Apple iOS, linux, unix;
a window event handler that is responsible for providing keystroke data to applications running on the operating system;
receiving a keystroke message at the window event handler;
decrypting one or more portions of the encrypted keystroke cipher segment at the window event handler;
transmitting a key ID to a first application;
storing an encrypted keystroke cipher segment in a preexisting field provided by a I/O message channel;
a preexisting field provided by an I/O message channel (e.g., an ExtraInformation field defined by a keyboard input data object);
a preexisting field is four bytes in size;
an encrypted keystroke cipher segment is four bytes in size;
encrypting a keystroke cipher segment is performed by an encryption module integrated with the keyboard device driver;
encrypting the keystroke cipher segment using Simon32 encryption algorithm;
a primary authentication code includes a shared authentication code that is known by both an encryption module configured to perform the encrypting of the keystroke cipher segment and a decryption module configured to perform the decrypting of the encrypted keystroke cipher segment, the method further comprising authenticating the keystroke message by the decryption module using the shared authentication code.

Exemplary Operating Environment

Figure 5:
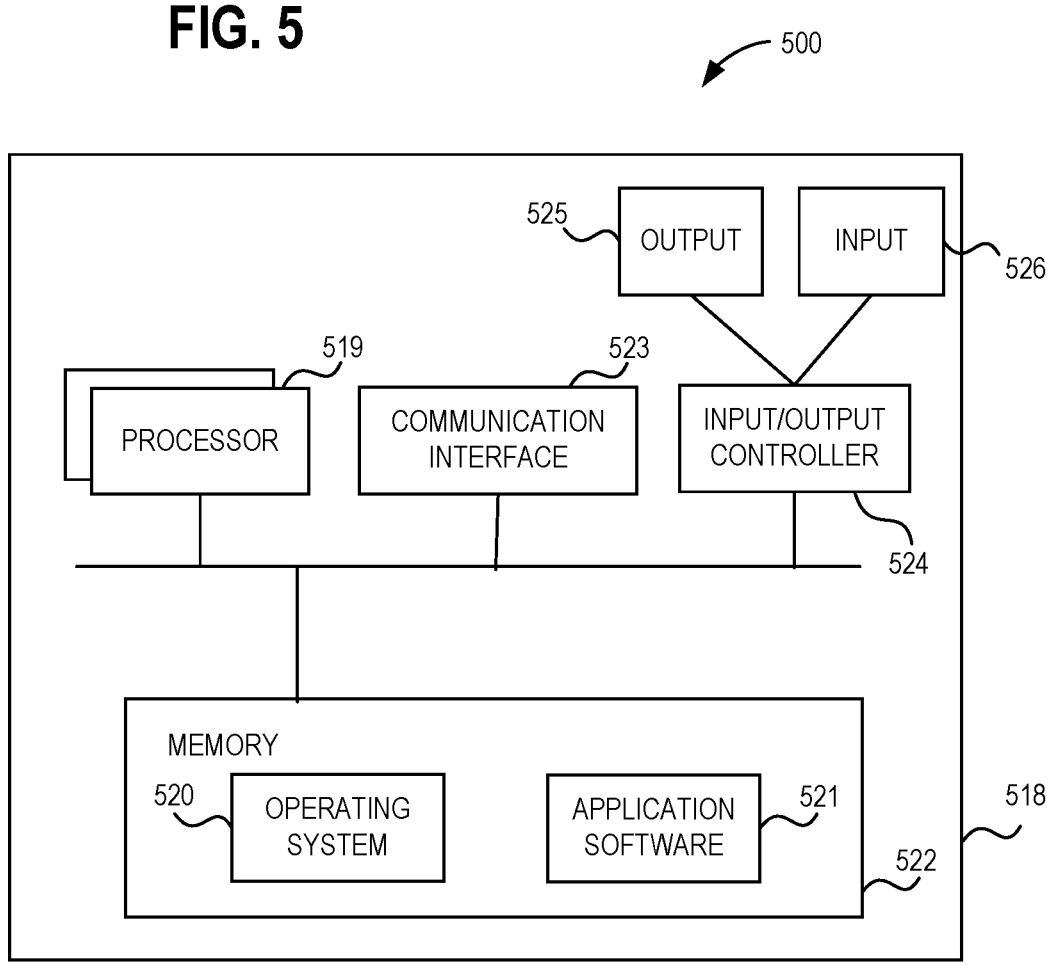
FIG. 5 illustrates a block diagram of an example computing apparatus that may be used as a component of an example architecture, such as that shown in FIG. 1.

The present disclosure is operable with a computing device (computing apparatus) according to an embodiment shown as a functional block diagram 500 in FIG. 5. In an embodiment, components of a computing apparatus 518 is implemented as part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hardcoded machine. Platform software comprising an operating system 520 or any other suitable platform software may be provided on the computing apparatus 518 to enable application software 521 to be executed on the device. According to an embodiment, the operations described herein are accomplished by software, hardware, and/or firmware.

Computer executable instructions may be provided using any computer-readable medium (e.g., any non-transitory computer storage medium) or media that are accessible by the computing apparatus 518. Computer-readable media may include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523). Computer storage media are tangible, non-transitory, and are mutually exclusive to communication media.

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone, or a touchpad. In one embodiment, the output device 525 may also act as the input device. An example of such a device is a touch sensitive display. The input/output controller 524 may also output data to devices other than the output device, e.g. a locally connected printing device. In some embodiments, a user provides input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation.

As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising." "including." and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method of encrypting keystroke data in a computing device, the method comprising:
    receiving, by a keyboard device driver of the computing device, a key identifier (ID) from a keyboard device, the key ID representing a keystroke event occurring on the computing device via the keyboard device;
    creating a keystroke cipher segment comprising a random number, a primary authentication code and the key ID;

encrypting the keystroke cipher segment resulting in an encrypted keystroke cipher segment;

transmitting the encrypted keystroke cipher segment in a keystroke message from the keyboard device driver to a window event handler via an input/output (I/O) message channel of an operating system running on the computing device, the window event handler being responsible for providing keystroke data to applications running on the operating system;

receiving the keystroke message at the window event handler;

decrypting the encrypted keystroke cipher segment, thereby identifying the key ID; and transmitting the key ID to a first application for further processing.

2. The computer-implemented method of claim 1, further comprising creating the keystroke message including storing the encrypted keystroke cipher segment in a preexisting field provided by the I/O message channel.

3. The computer-implemented method of claim 2, wherein the preexisting field provided by the I/O message channel is an ExtraInformation field defined by a keyboard input data object.

4. The computer-implemented method of claim 2, further comprising regenerating the random number and the primary authentication code for another key ID.

5. The computer-implemented method of claim 1, wherein encrypting the keystroke cipher segment is performed by an encryptor integrated with the keyboard device driver.

6. The computer-implemented method of claim 1, wherein encrypting the keystroke cipher segment includes encrypting the keystroke cipher segment with a random quantity of encryption rounds using a different key in each of the encryption rounds.

7. The computer-implemented method of claim 1, wherein the primary authentication code includes a shared authentication code that is known by both an encryptor configured to perform the encrypting of the keystroke cipher segment and a decryptor configured to perform the decrypting of the encrypted keystroke cipher segment, the method further comprising authenticating the keystroke message by the decryptor using the shared authentication code.

8. A computer system comprising:
a keyboard device;
a processor; and
a non-transitory computer readable medium having stored thereon program code executable by the processor, the program code causing the processor to:
receive, by a keyboard device driver managing the keyboard device, a key identifier (ID) from the keyboard device, the key ID representing a keystroke event occurring via the keyboard device;
create a keystroke cipher segment comprising a random number, a primary authentication code and the key ID;
encrypt the keystroke cipher segment resulting in an encrypted keystroke cipher segment;
transmit the encrypted keystroke cipher segment in a keystroke message from the keyboard device driver to a window event handler via an input/output (I/O) message channel of an operating system running on the computer system, the window event handler being responsible for providing keystroke data to applications running on the operating system;
receive the keystroke message at the window event handler;
decrypt the encrypted keystroke cipher segment, thereby identifying the key ID; and
transmit the key ID to a first application for further processing.

9. The computer system of claim 8, wherein the program code further causes the processor to create the keystroke message including storing the encrypted keystroke cipher segment in a preexisting field provided by the I/O message channel.

10. The computer system of claim 9, wherein the preexisting field provided by the I/O message channel is an ExtraInformation field defined by a keyboard input data object.

11. The computer system of claim 9, wherein the program code further causes the processor to regenerate the random number and the primary authentication code for another key ID.

12. The computer system of claim 8, wherein encrypting the keystroke cipher segment is performed by an encryptor integrated with the keyboard device driver.

13. The computer system of claim 8, wherein encrypting the keystroke cipher segment includes encrypting the keystroke cipher segment with a random quantity of encryption rounds using a different key in each of the encryption rounds.

14. The computer system of claim 8, wherein the primary authentication code includes a shared authentication code that is known by both an encryptor configured to perform the encrypting of the keystroke cipher segment and a decryptor configured to perform the decrypting of the encrypted keystroke cipher segment, the program code further causing the processor to authenticate the keystroke message by the decryptor using the shared authentication code.

15. A non-transitory computer storage medium having stored thereon program code executable by a processor, the program code embodying a method comprising:
receiving, by a keyboard device driver, a key identifier (ID) from a keyboard device, the key ID representing a keystroke event occurring on a computing device via the keyboard device;
creating a keystroke cipher segment comprising a random number, a primary authentication code and the key ID;
encrypting the keystroke cipher segment resulting in an encrypted keystroke cipher segment;
transmitting the encrypted keystroke cipher segment in a keystroke message from the keyboard device driver to a window event handler via an input/output (I/O) message channel of an operating system, the window event handler being responsible for providing keystroke data to applications running on the operating system;
receiving the keystroke message at the window event handler;
decrypting the encrypted keystroke cipher segment, thereby identifying the key ID; and
transmitting the key ID to a first application for further processing.

16. The non-transitory computer storage medium of claim 15, wherein the method further comprises creating the keystroke message including storing the encrypted keystroke cipher segment in a preexisting field provided by the I/O message channel.

17. The non-transitory computer storage medium of claim 16, wherein the preexisting field provided by the I/O message channel is an ExtraInformation field defined by a keyboard input data object.

18. The non-transitory computer storage medium of claim 15, wherein encrypting the keystroke cipher segment is performed by an encryptor integrated with the keyboard device driver.

19. The non-transitory computer storage medium of claim 15, wherein encrypting the keystroke cipher segment includes encrypting the keystroke cipher segment with a random quantity of encryption rounds using a different key in each of the encryption rounds.

20. The non-transitory computer storage medium of claim 15, wherein the primary authentication code includes a shared authentication code that is known by both an encryptor configured to perform the encrypting of the keystroke cipher segment and a decryptor configured to perform the decrypting of the encrypted keystroke cipher segment, the method further comprising authenticating the keystroke message by the decryptor using the shared authentication code.

* * * * *